(12) United States Patent
Taniji

(10) Patent No.: US 6,215,520 B1
(45) Date of Patent: Apr. 10, 2001

(54) SOLID STATE IMAGE PICKUP APPARATUS CAPABLE OF IMPROVING SMEAR CHARACTERISTICS AND INCREASING DYNAMIC RANGE AND HAVING HIGH CHARGE TRANSFER EFFICIENCY

(75) Inventor: Yukio Taniji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/975,457

(22) Filed: Nov. 21, 1997

(30) Foreign Application Priority Data

Nov. 21, 1996 (JP) .................................................. 8-310353

(51) Int. Cl.[7] .................................................. H04N 9/64
(52) U.S. Cl. ........................................... 348/249; 348/316
(58) Field of Search .................................... 348/241, 243, 348/245, 246, 247, 248, 249, 250, 207, 316, 311; 250/208.1; H04N 9/64

(56) References Cited

U.S. PATENT DOCUMENTS 4,010,319 * 3/1977 Levine .................................. 348/248
4,581,651 * 4/1986 Miyata et al. ........................ 348/249
5,089,894 * 2/1992 Higashisutsumi .................... 348/249
5,883,667 * 3/1999 Taniji .................................... 348/248

FOREIGN PATENT DOCUMENTS 4-330876    11/1992 (JP) .

* cited by examiner

Primary Examiner—Tuan Ho
(74) Attorney, Agent, or Firm—Sughrue, Mion, Zinn, Macpeak & Seas, PLLC

(57) ABSTRACT

In a CCD type solid state image pickup apparatus including two-dimensionally arranged photodiodes, a plurality of vertical transfer registers, and at least one horizontal transfer register, at least two different signal charges of each column of the photodiodes based upon different charge storing time periods are transferred to one of the vertical transfer registers, so that the different signal charges are combined with respective smear charges within the vertical transfer registers. The different signal charges combined with the smear charges and independent smear charges are transferred to the horizontal transfer register. One of the independent smear charges is subtracted from each of the different signal charges combined with the smear charges, and as a result, obtained different signal charges are summed to generate an output voltage.

8 Claims, 15 Drawing Sheets

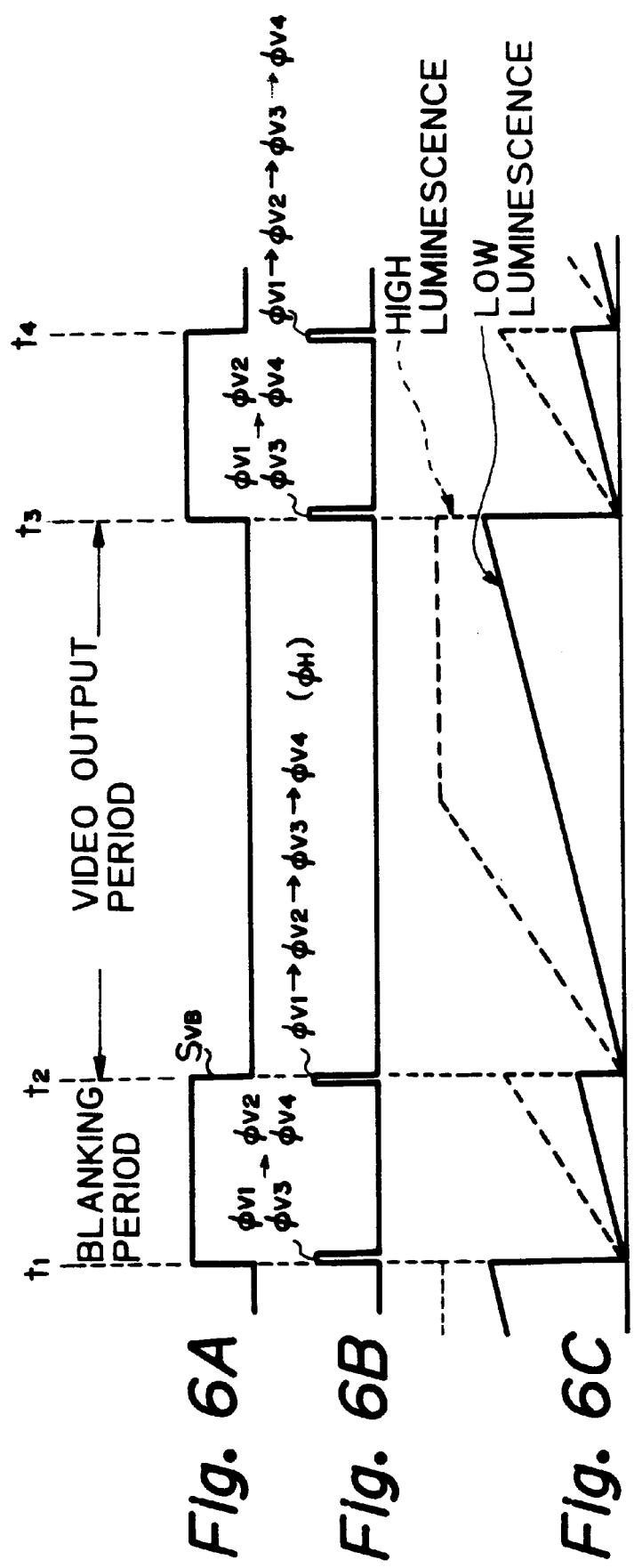

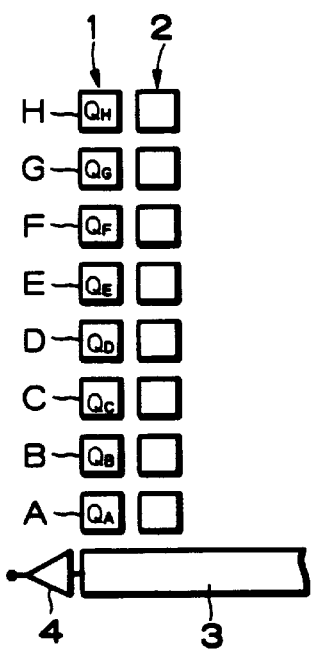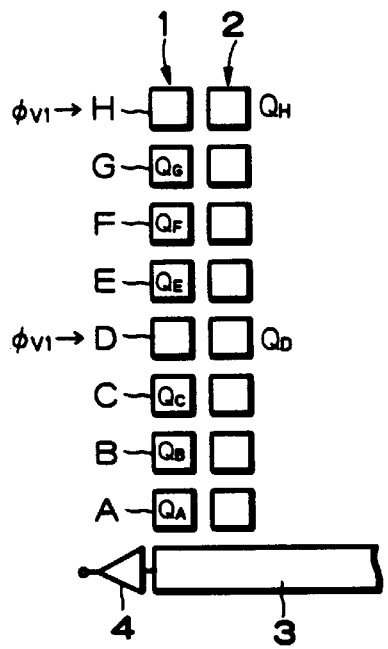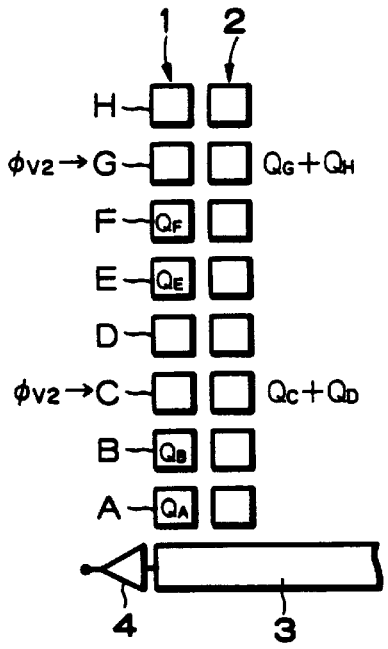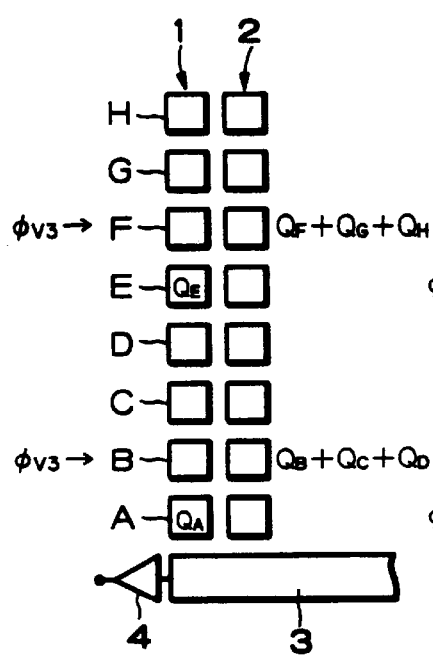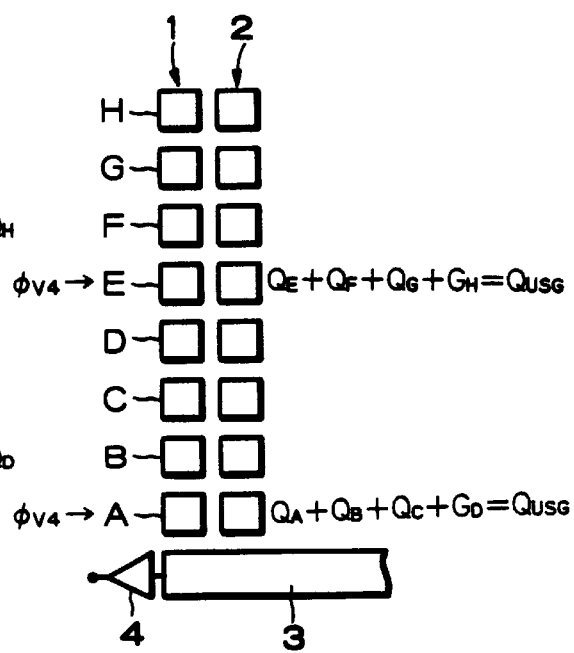

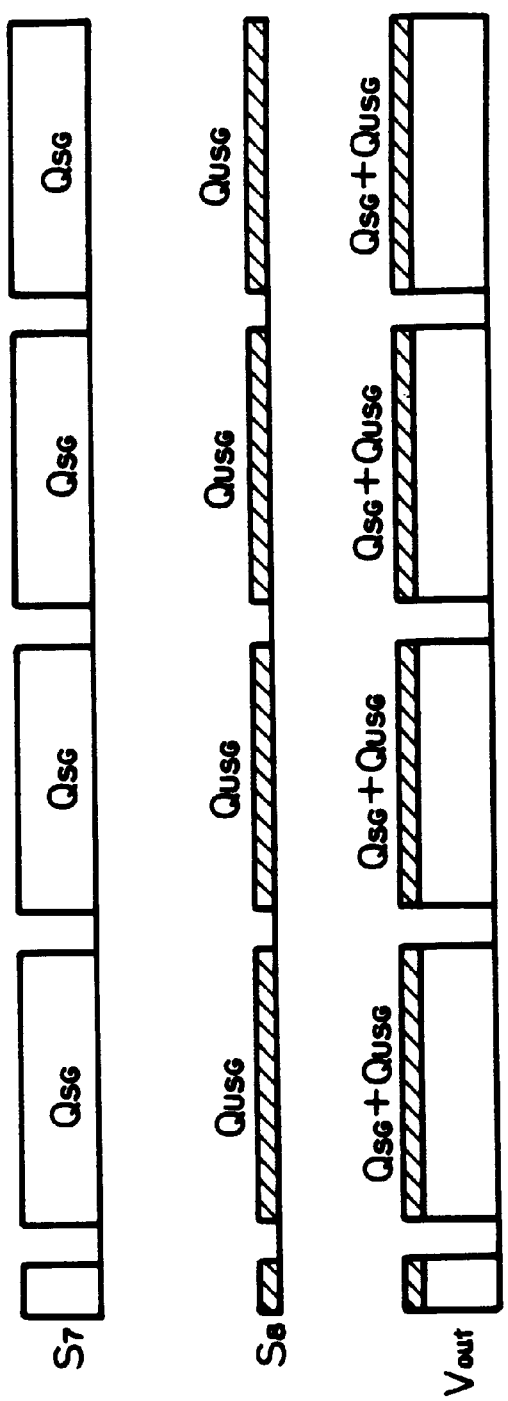

*Fig. 10*

|  | T1 | T2 | T3 | T4 | T5 | T6 | T7 | T8 |
|---|---|---|---|---|---|---|---|---|
| SW1 | D | U | D | U | D | U | D | U |
| SW2 | D | D | U | U | U | U | D | D |
| SW3 | D | D | U | U | D | D | U | U |

SOLID STATE IMAGE PICKUP APPARATUS CAPABLE OF IMPROVING SMEAR CHARACTERISTICS AND INCREASING DYNAMIC RANGE AND HAVING HIGH CHARGE TRANSFER EFFICIENCY

BACKGROUND OF THE INVENTION

1. Field of the Invention

The present invention relates to an inter-line type charge coupled device (CCD) solid state image pickup apparatus (CCD apparatus).

2. Description of the Related Art

Two-dimensional CCD solid state pickup apparatuses instead of pickup tubes have been used in family video cameras, electronic news gathering (ENG) cameras and the like.

Generally, a CCD apparatus includes two-dimensionally arranged photodiodes in rows, columns; a plurality of vertical transfer registers, each connected to one column of the photodiodes; and a horizontal transfer register connected to the vertical transfer registers. In the CCD apparatus, signal charges are transferred from the photodiodes to the vertical transfer registers; however, smear charges are also transferred to the vertical transfer registers. Such smear charges cause image defects which appear to be extended within the vertical transfer registers. Particularly, CCD apparatuses have recently been fine-structured to obtain a high resolution; however, in this case, the characteristics of the CCD apparatus such as the smear characteristics and the dynamic range have been deteriorated. That is, in the CCD apparatus, the high resolution has a trade-off relationship with the characteristics. This will be explained later in detail.

In order to improve the smear characteristics and increase the dynamic range, in a prior art inter-line type CCD apparatus (see JP-A-4-330876), a horizontal transfer register for transferring smear charges is added to a horizontal transfer register for transferring signal charges including smear charges. In a low luminescence state, an output voltage is obtained by subtracting a voltage corresponding to the smear charges from a voltage corresponding to the signal charges including smear charges. Thus, the component of smear charges is suppressed in the output voltage, to improve the smear characteristics. On the other hand, in a high luminescence state, the output voltage can be increased by adding the voltage corresponding to smear charges thereto, thus increasing the dynamic range. In this prior art CCD apparatus, however, the resolution in a high luminescence state is still deteriorated. This will also be explained later in detail.

SUMMARY OF THE INVENTION

It is an object of the present invention to provide a CCD apparatus capable of improving the smear characteristics and increasing the dynamic range without deteriorating the resolution even in a high luminescence state.

According to the present invention, in an interline type CCD solid state image pickup apparatus including two-dimensionally arranged photodiodes, a plurality of vertical transfer registers, and at least one horizontal transfer register, at least two different signal charges of each column of the photodiodes based upon different charge storing time periods are transferred to one of the vertical transfer registers, so that the different signal charges are combined with respective smear charges within the vertical transfer registers. The different signal charges combined with the smear charges and independent smear charges are transferred to the horizontal transfer register. One of the independent smear charges is subtracted from each of the different signal charges combined with the smear charges, and as a result, obtained different signal charges are summed to generate an output voltage.

BRIEF DESCRIPTION OF THE DRAWINGS

The present invention will be more clearly understood from the description as set forth below, in comparison with the prior art, with reference to the accompanying drawings, wherein:

FIGS. 6A, 6B and 6C are timing diagrams for explaining the operation of the apparatus of FIG. 5;

FIGS. 7A, 7B, 7C, 7D, 7E, 8A, 8B and 8C are plan views of the photodiodes and the vertical transfer register for explaining the vertical transfer operation of the apparatus of FIG. 5;

FIGS. 9A through 9K are timing diagrams showing the output operation of the apparatus of FIG. 5;

FIG. 10 is a table for showing the operation of the switching circuit of FIG. 5;

DESCRIPTION OF THE PREFERRED EMBODIMENTS

Before the description of the preferred embodiments, prior art inter-line type CCD solid state image pickup apparatuses will be explained with reference to FIGS. 1, 2 and 3.

Figure 1:
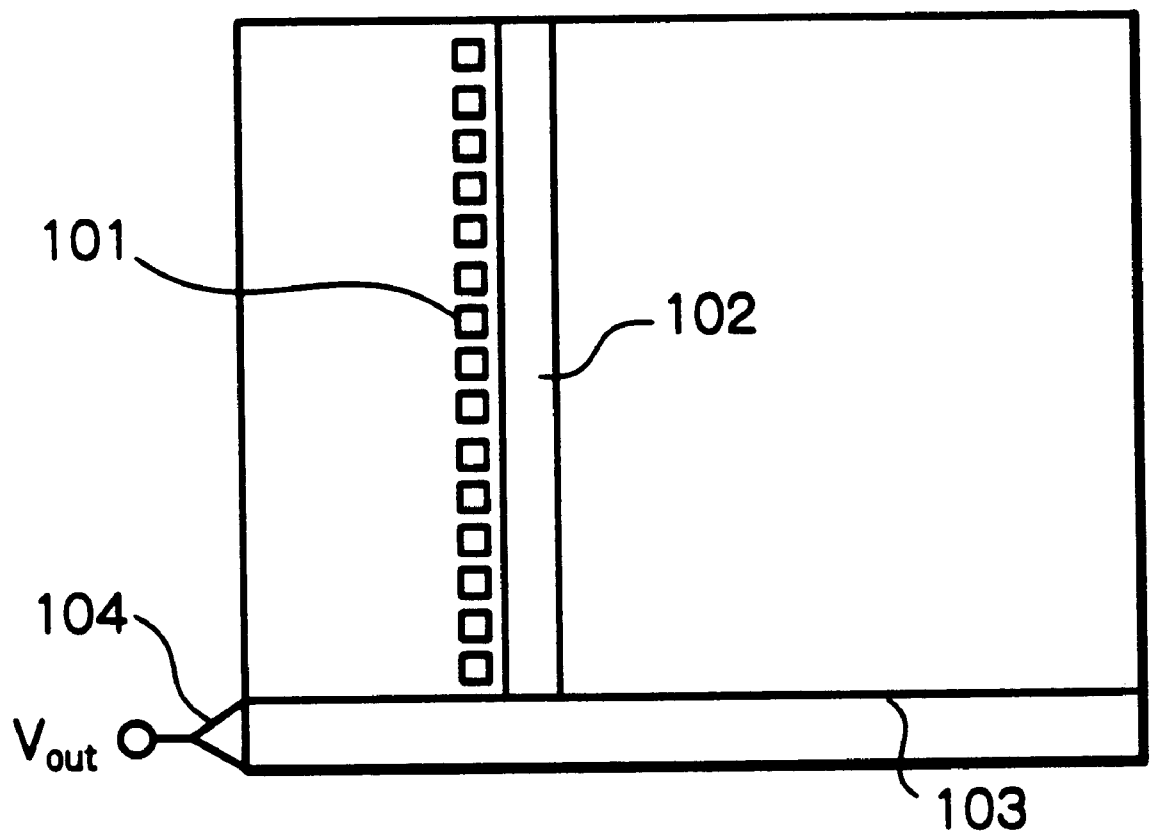
FIG. 1 is a plan view illustrating a first prior art inter-line type CCD solid state image pickup apparatus.

In FIG. 1, which illustrates a first inter-line type CCD solid state image pickup apparatus, light is incident to two-dimensionally arranged photodiodes 101, and as a result, signal charges obtained by the photodiodes 101 are transferred to a vertical transfer register 102. The signal charges are further transferred via a horizontal transfer register 103 to an output amplifier 104 which generates an output voltage $V_{out}$.

Figure 2:
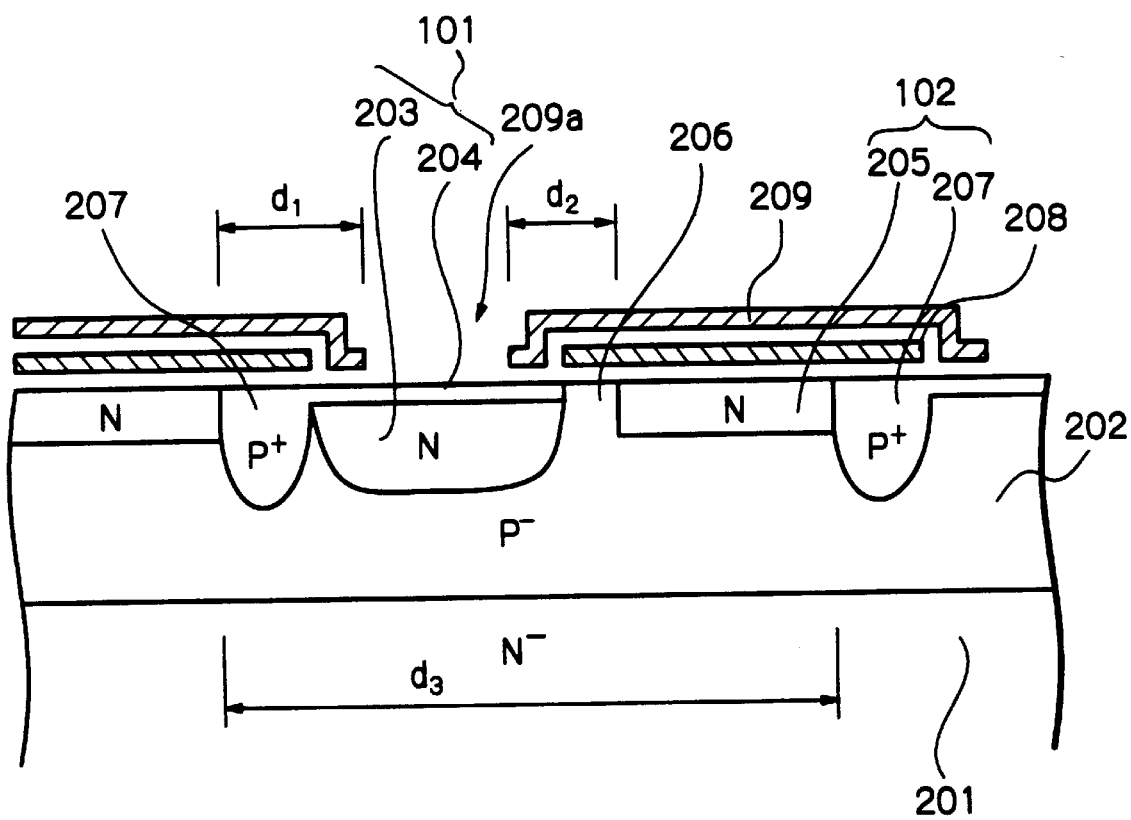
FIG. 2 is a partially-enlarged cross-sectional view of the photodiode and the vertical transfer register of FIG. 1.

In FIG. 2, which is a partially-enlarged cross-sectional view of one of the photodiodes 101 and one pixel of the vertical transfer register 102 of FIG. 1, reference numeral 201 designates an N-type silicon substrate on which a P⁻-type well layer 202 is formed. The photodiode 101 is constructed by an N-type impurity region 203 and a P⁺-type impurity region 204 formed within the P⁻-type well layer 202. Also, the vertical transfer register 102 is constructed by an N-type impurity diffusion region 205 formed with the P⁻-type well layer 202. Provided between the photodiode 101 and the vertical transfer register 102 is a read gate portion 206. Every column of the photodiodes 101 as well as the vertical transfer register 102 is isolated from the other columns by P⁺-type channel stopper regions 207 formed within the P⁻-type well layer 202.

Also, a vertical register transfer electrode 208 is formed above the N-type impurity region 205 as well as the gate read portion 206. In this case, the vertical register transfer electrode 208 also serves as a read gate. Further, an optical shield layer 209 is provided for passing light through the opening 209a opposing the photodiode 101.

The CCD apparatus of FIGS. 1 and 2 has been fine-structured to obtain a high resolution; however, in this case, the characteristics of the CCD apparatus such as the smear characteristics and the dynamic range have been deteriorated. That is, in the CCD apparatus of FIGS. 1 and 2, the high resolution has a trade-off relationship with the characteristics.

First, the smear characteristics of the CCD apparatus of FIGS. 1 and 2 are related to the distance $d_1$ ($d_2$) between the edge of the optical shield layer 209 and the vertical transfer register 102. That is, when the pixel size of the CCD apparatus is decreased so that the distances $d_1$ and $d_2$ are decreased, the smear characteristics are deteriorated.

In addition, the dynamic range is limited by the stored capacity of each of the photodiodes 101 or the transfer capacity of the vertical transfer register 102. Therefore, when the pixel size of the CCD apparatus is decreased so that the pixel pitch $d_3$ is decreased, the dynamic range is decreased.

Figure 3:
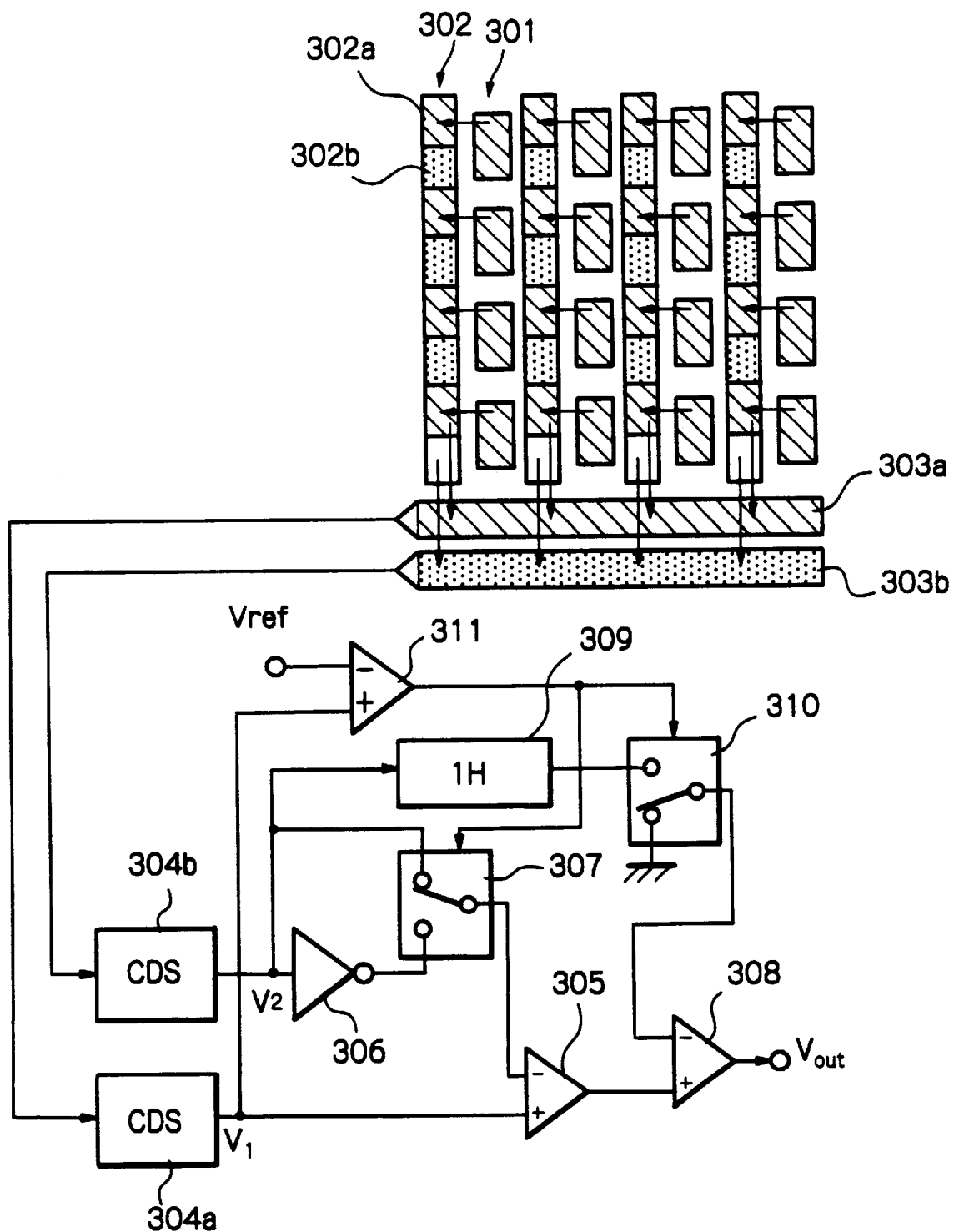
FIG. 3 is a plan view illustrating a second prior art inter-line type CCD solid state image pickup apparatus.

In FIG. 3, which illustrates a second prior art inter-line type CCD apparatus (see JP-A-4-330876), reference numeral 301 designates a column of photodiodes, and 302 designates a vertical transfer register which are divided into sections 302a for storing signal charges and smear charges and sections 302b for storing smear charges. The charges of the sections 302a of the vertical transfer register 302 are transferred via a horizontal transfer register 303a to a correlation double sampling circuit 304a, while the charges of the sections 302b of the vertical transfer register 302 are transferred via a horizontal transfer register 303b to a correlation double sampling circuit 304b. The output of the correlation double sampling circuit 304a is supplied to an input of a differential amplifier 305, while the output of the correlation double sampling circuit 304b is supplied via an inverter 306 and an analog switch 307 to the other input of the differential amplifier 305. Also, the output of the differential amplifier 305 is supplied to an input of a differential amplifier 308, while the output of the correlation double sampling circuit 304b is supplied via a 1H line memory 309 and an analog switch 310 to the other input of the differential amplifier 308. The analog switches 307 and 310 are controlled by a comparator 311 which receives the output of the correlation double sampling circuit 304a. Note that the output voltages $V_1$ and $V_2$ of the correlation double sampling circuits 304a and 304b are limited by a maximum value $V_{max}$. Also, a reference voltage $V_{ref}$ of the comparator 311 is approximately the same as the maximum value $V_{max}$, but is a little lower than the maximum value $V_{max}$.

In a low luminescence state, the output voltage $V_1$ of the correlation double sampling circuit 304a is lower than the reference voltage $V_{ref}$. As a result, the comparator 311 controls the analog switches 307 and 310, so that the states of the analog switches 307 and 310 are as shown in FIG. 3. As a result, in the differential amplifier 305, the voltage $V_2$ corresponding to the amount of smear charges generated from the correlation double sampling circuit 304b is subtracted from the voltage $V_1$ corresponding to the amount of the signal charges plus the smear charges generated from the correlation double sampling circuit 304a, to obtain the amount of signal charges. In this case, since 0V is supplied to the other input of the differential amplifier 308, the output voltage $V_{out}$ of the differential amplifier 308 represents the amount of signal charges. Thus, the component of smear charges is suppressed in the output voltage $V_{out}$, to improve the smear characteristics.

Figure 4:
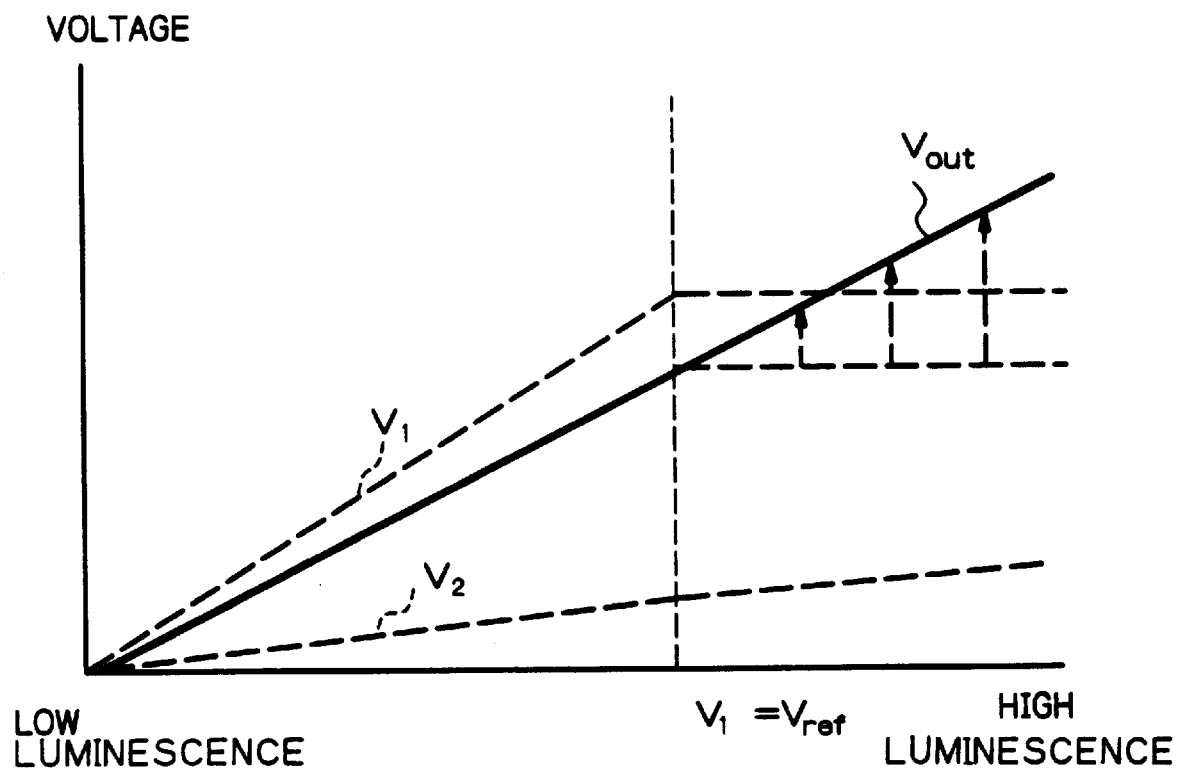
FIG. 4 is a graph showing the output voltage characteristics of the apparatus of FIG. 3.

On the other hand, in a high luminescence state, the output voltage $V_1$ of the correlation double sampling circuit 304a is higher than the reference voltage $V_{ref}$. In this case, additional signal charges are introduced into the sections 302b of the vertical transfer register 302, so that a voltage corresponding to the additional signal charges is added to the output voltage $V_2$ of the correlation double sampling circuit 304b. As a result, the comparator 311 controls the analog switches 307 and 310, so that the states of the analog switches 307 and 310 are opposite to those as shown in FIG. 3. As a result, in the differential amplifier 305, the voltage $V_2$ corresponding to the amount of smear charges plus the amount of the additional signal charges generated from the correlation double sampling circuit 304b is added to the saturated voltage $V_1$ of the correlation double sampling circuit 304a, to obtain the amount of signal charges plus smear charges. In this case, since the output of the 1H line memory 309 showing the amount of smear charges is supplied to the other input of the differential amplifier 308, the amount of smear charges is subtracted from the amount of signal charges plus the amount of smear charges. Therefore, the output voltage $V_{out}$ of the differential amplifier 308 also represents the amount of signal charges. Thus, as shown in FIG. 4, even when the output voltage $V_1$ of the correlation double sampling circuit 304a is saturated, the output voltage $V_{out}$ can be increased, to increase the dynamic range.

In the apparatus of FIG. 3, in a high luminescence state, when the voltage corresponding to one of the sections 302a of the vertical transfer register 302 is calculated, only additional signal charges introduced into one of the sections 302b of the vertical transfer register 302 immediately before the one of the sections 302a of the vertical transfer register 302 are considered. However, in such a high luminescence state, additional signal charges are introduced into one of the sections 302b of the vertical transfer register 302 immediately after the one of the sections 302a of the vertical transfer register 302. Therefore, the resolution in a high luminescence state is still deteriorated.

Figure 5:
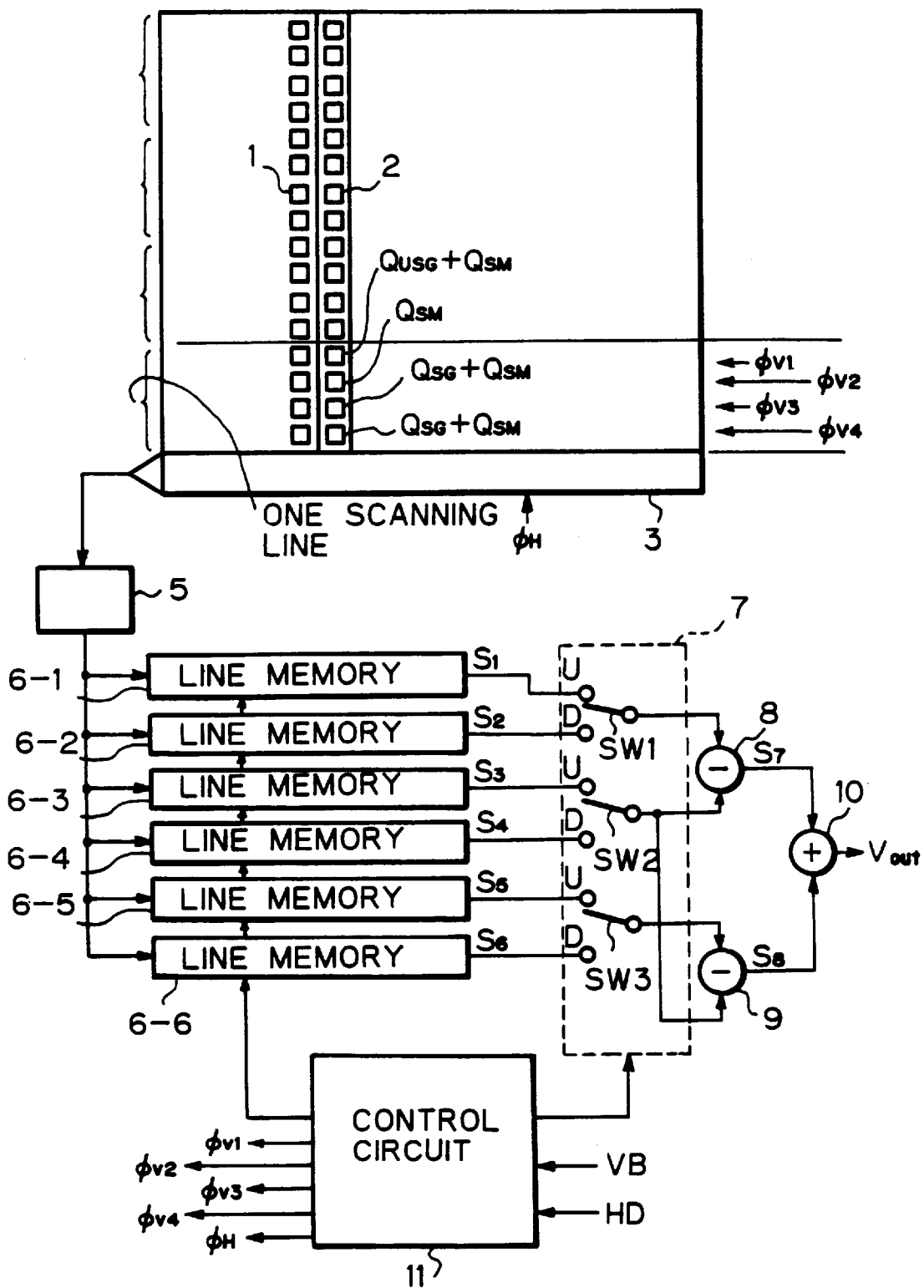
FIG. 5 is a block circuit diagram illustrating a first embodiment of the inter-line type CCD solid state image pickup apparatus according to the present invention.

In FIG. 5, which illustrates a first embodiment of the present invention, reference numeral 1 designates a column of photodiodes, and 2 designates a vertical transfer register. Charges are further transferred via a horizontal transfer register 3 to an output amplifier 104. The vertical transfer register 2 is operated by four-phase vertical transfer pulse signals $\phi_{v1}$, $\phi_{v2}$, $\phi_{v3}$ and $\phi_{v4}$, and the horizontal transfer register 3 is operated by a horizontal transfer pulse signal $\phi_H$.

The output signal of the output amplifier 4 is supplied via a white clip circuit 5 to line memories 6-1, 6-2, 6-3, 6-4, 6-5 and 6-6. The output signal of the output amplifier 4 is guarded by a maximum value in the white clip circuit 5. In other words, if the level of the output signal of the output amplifier 4 exceeds the maximum value, the while clip circuit 5 generates a signal having the maximum value. Otherwise, the white clip circuit 5 passes the output signal of the output amplifier 4 therethrough. Thus, the fluctuation of saturation of the output signal of the output amplifier 4 can be suppressed. Also, each of the line memories 6-1, 6-2, ..., 6-6 can store pixels of one horizontal line. Note that the line memories 6-1, 6-2, ..., 6-6 are constructed by analog memories; however, the line memories 6-1, 6-2, ..., 6-6 can be constructed by digital memories. In this case, an analog/digital (A/D) converter is inserted between the white clip circuit 5 and the line memories 6-1, 6-2, ..., 6-6.

The output signals of the line memories 6-1, 6-2, ..., 6-6 are supplied via a switching circuit 7 to subtracters 8 and 9 and an adder 10 to obtain an output voltage $V_{out}$.

A control circuit 11 receives a vertical blanking signal VB and a horizontal synchronization signal HD to generate the vertical transfer pulse signals $\phi_{v1}$, $\phi_{v2}$, $\phi_{v3}$ and $\phi_{v4}$, and the horizontal transfer pulse signal $\phi_H$. Also, the control circuit 11 controls the line memories 6-1, 6-2, ..., 6-6 and the switching circuit 7.

The operation of the apparatus of FIG. 5 is explained next with reference to FIGS. 6A, 6B, 6C, 7A, 7B, 7C, 7D, 7E, 8A, 8B, 8C and 9A through 9K. Here, assume that the operation is based upon an interlace operation.

The vertical blanking signal VB as shown in FIG. 6A defines blanking periods and video output periods. As shown in FIG. 6B, at the end of every video output period, the control circuit 11 generates the vertical transfer pulse signals $\phi_{v1}$ and $\phi_{v3}$, and thereafter, generates the vertical transfer pulse signals $\phi_{v2}$ and $\phi_{v4}$. On the other hand, as shown in FIG. 6B, at the end of each blanking period, the control circuit 11 generates the vertical transfer pulse signals $\phi_{v1}$, $\phi_{v2}$, $\phi_{v3}$ and $\phi_{v4}$ sequentially. Also, during each of the video output periods, the control circuit 11 generates the horizontal transfer pulse signal $\phi_H$ after one pixel vertical transfer operation to perform one horizontal transfer operation upon the horizontal transfer register 3. Also, as shown in FIG. 6C, since the charges generated in the photodiodes 1 are transferred to the vertical transfer register 2, the charges in the photodiodes 1 are cleared at the ends of the video output periods and the blanking periods.

The vertical transfer operation of the apparatus of FIG. 5 is explained next in detail with reference to FIGS. 7A, 7B, 7C, 7D and 7E and FIGS. 8A, 8B and 8C.

A time $t_2$ ($t_4$) of FIGS. 6A, 6B and 6C, assume that signal charges $Q_A$, $Q_B$, ..., $Q_H$ are generated in the photodiodes A, B, ..., H, respectively, as shown in FIG. 7A. In this state, when the vertical transfer pulse signal $\phi_{v1}$ is generated, the signal charges $Q_B$ and $Q_H$ are transferred to the vertical transfer register 2 as shown in FIG. 7B. In this case, a one-pixel vertical transfer operation is not carried out, so that there is no addition between the signal charges. Next, when the vertical transfer pulse signal $\phi_{v2}$ is generated, the signal charges $Q_C$ and $Q_G$ are transferred to the vertical transfer register 2 as shown in FIG. 7C. In this case, a one-pixel vertical transfer operation is also carried out, so that the signal charges $Q_C$ and $Q_G$ are added to the signal charges $Q_D$ and $Q_H$, respectively, to form signal charges $Q_C+Q_D$ and $Q_G+Q_H$ in the vertical transfer register 2. Next, when the vertical transfer pulse signal $\phi_{v3}$ is generated, the signal charges $Q_B$ and $Q_F$ are transferred to the vertical transfer register 2 as shown in FIG. 7D. In this case, a one-pixel vertical transfer operation is also carried out, so that the signal charges $Q_B$ and $Q_F$ are added to the signal charges $Q_C+Q_D$ and $Q_G+Q_H$, respectively, to form signal charges $Q_B+Q_C+Q_D$ and $Q_F+Q_G+Q_H$ in the vertical transfer register 2. Finally, when the vertical transfer pulse signal $\phi_{v4}$ is generated, the signal charges $Q_A$ and $Q_E$ are transferred to the vertical transfer register 2 as shown in FIG. 7E. In this case, since a one-pixel vertical transfer operation is also carried out, the signal charges $Q_A$ and $Q_E$ are added to the signal charges $Q_B+Q_C+Q_D$ and $Q_F+Q_G+Q_H$, respectively, to form signal charges $Q_A+Q_B+Q_C+Q_D$ and $Q_E+Q_F+Q_G+Q_H$ in the vertical transfer register 2. For simplifying the description, each of the signal charges $Q_A+Q_B+Q_C+Q_D$ and $Q_E+Q_F+Q_G+Q_H$ is denoted by unsaturated signal charges $Q_{USC}$. Thus, the unsaturated signal charges $Q_{USG}$ are formed in every four elements of the vertical transfer register 2.

Figure 8A:
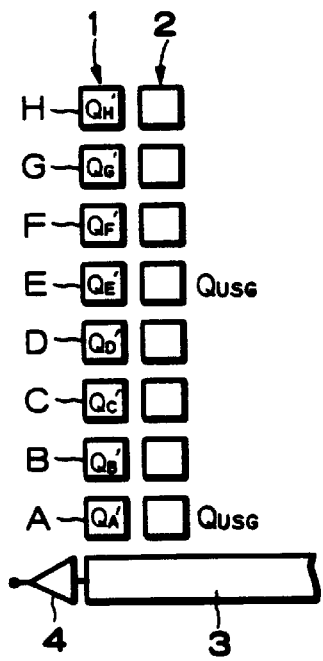
Figure 8B:
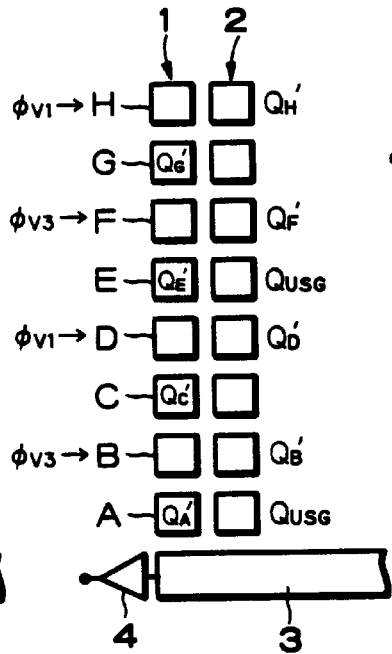
Figure 8C:
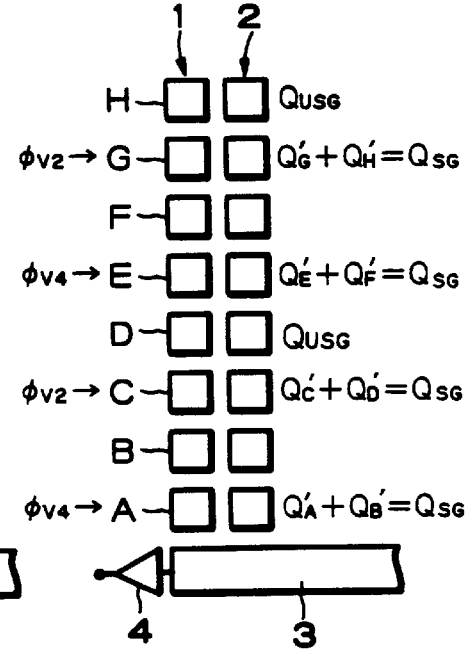

At time $t_1$ ($t_3$) of FIGS. 6A, 6B and 6C, assume that signal charges $Q_A'$, $Q_B'$, ..., $Q_H'$ are generated in the photodiodes A, B, ..., H, respectively, as shown in FIG. 8A. In this state, when the vertical transfer pulse signals $\phi_{v1}$ and $\phi_{v3}$ are generated, the signal charges $Q_B'$, $Q_D'$, $Q_F'$ and $Q_H'$ are transferred to the vertical transfer register 2 as shown in FIG. 8B. In this case, a one-pixel vertical transfer operation is not carried out, there is no addition between the signal charges. Next, when the vertical transfer pulse signals $\phi_{v2}$ and $\phi_{v4}$ are generated, the signal charges $Q_A'$, $Q_C'$, $Q_E'$ and $Q_G'$ are transferred to the vertical transfer register 2 as shown in FIG. 8C. In this case, a one-pixel vertical transfer operation is also carried out that so, the signal charges $Q_A'$, $Q_C'$, $Q_E'$ and $Q_G'$ are added to the signal charges $Q_B'$, $Q_D'$, $Q_F'$ and $Q_H'$, respectively, to form signal charges $Q_A'+Q_B'$, $Q_C'+Q_D'$, $Q_E'+Q_F'$ and $Q_G'+Q_H'$ in the vertical transfer register 2. For simplifying the description, each of the signal charges $Q_A'+Q_B'$, $Q_C'+Q_D'$, $Q_E'+Q_F'$ and $Q_C'+Q_H'$ is denoted by signal charges $Q_{SG}$. Thus, the signal charges $Q_{SG}$ are formed in every two elements of the vertical transfer register 2.

Note that there is a smear charge $Q_{SM}$ in each element of the vertical transfer register 2, although the smear charge $Q_{SM}$ is not illustrated in FIGS. 7A, 7B, 7C, 7D, 7E, 8A, 8B and 8C. Therefore, as illustrated in FIG. 5, the charge $Q_{SG}+Q_{SM}$ is formed in every two lines (photodiodes), the charge $Q_{USG}+Q_{SM}$ is formed in every four lines (photodiodes), and the smear charge $Q_{SM}$ is formed in every four lines (photodiodes). That is, the number of transfer pixels relating to $Q_{USG}+Q_{SM}$ and $Q_{SM}$ is smaller than that of transfer pixels relating to $Q_{SG}+Q_{SM}$, because the charges $Q_{USG}+Q_{SM}$ and $Q_{SM}$ should essentially be considered to be in a high luminescence state.

The output operation of the apparatus of FIG. 5 is further explained next with reference to FIGS. 9A through 9K.

Figures 9A, 9B, 9C, 9D, 9E, 9F, 9G, 9H:
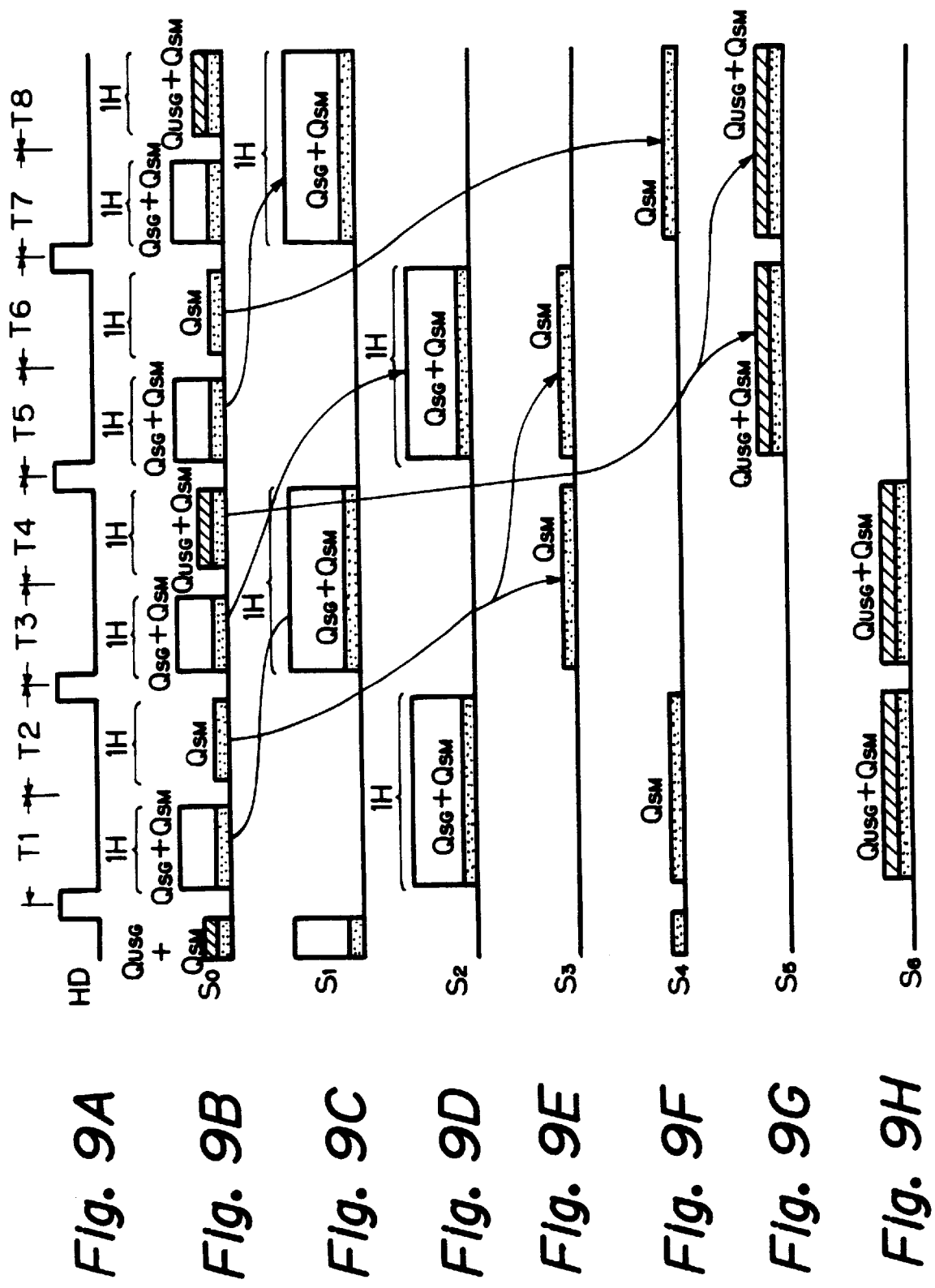

As shown in FIG. 9B, the output signal of the horizontal transfer register 3, i.e., the output signal $S_0$ of the white clip circuit 5 is output at a rate twice the rate of the horizontal synchronization signal HD as shown in FIG. 9A, due to the presence of a single horizontal transfer register.

In a time period T1, the control circuit 11 selects the line memory 6-1, so that the signals of pixels of a first horizontal line relating to $Q_{SG}+Q_{SM}$ are written into the line memory 6-1, as shown in FIG. 9D.

In a time period T2, the control circuit 11 selects the line memory 6-3, so that the signals of pixels of a second horizontal line relating to $Q_{SM}$ are written into the line memory 6-3, as shown in FIG. 9E.

In a time period T2, the control circuit 11 selects the line memory 6-3, so that the signals of pixels of a second horizontal line relating to $Q_{SM}$ are written into the line memory 6-3, as shown in FIG. 9E.

In a time period T3, the control circuit 11 selects the line memory 6-2, so that the signals of pixels of a third horizontal line relating to $Q_{SG}+Q_{SM}$ are written into the line memory 6-2, as shown in FIG. 9D.

In a time period T4, the control circuit 11 selects the line memory 6-5, so that the signals of pixels of a fourth horizontal line relating to $Q_{USG}+Q_{SM}$ are written into the line memory 6-5, as shown in FIG. 9G.

In a time period T5, the control circuit 11 selects the line memory 6-1, so that the signals of pixels of a fifth horizontal line relating to $Q_{SG}+Q_{SM}$ are written into the line memory 6-1, as shown in FIG. 9C.

In a time period T6, the control circuit 11 selects the line memory 6-4, so that the signals of pixels of a sixth horizontal line relating to $Q_{SM}$ are written into the line memory 6-4, as shown in FIG. 9F.

In a time period T7, the control circuit 11 selects the line memory 6-2, so that the signals of pixels of a seventh horizontal line relating to $Q_{SG}+Q_{SM}$ are written into the line memory 6-2, as shown in FIG. 9D.

In a time period T8, the control circuit 11 selects the line memory 6-6, so that the signals of pixels of an eighth horizontal line relating to $Q_{USG}+Q_{SM}$ are written into the line memory 6-6, as shown in FIG. 9H.

Switches SW1, SW2 and SW3 of the switching circuit 7 are controlled by the control circuit 11 in accordance with a table as shown in FIG. 10. As a result, as shown in FIGS. 9C and 9D, the signals relating to $Q_{SG}+Q_{SM}$ are read from the line memories 6-1 and 6-2 alternately. Also, as shown in FIGS. 9E and 9F, the signals relating to $Q_{SM}$ are read from one of the line memories 6-3 and 6-4 for two successive horizontal periods. Further, as shown in FIGS. 9G and 9H, the signals relating to $Q_{USG}+Q_{SM}$ are read from one of the line memories 6-5 and 6-6 for two successive horizontal periods.

As a result, as shown in FIG. 9I, signals relating to $Q_{SG}$ are obtained by the subtracter 8. Similarly, as shown in FIG. 9J, signals relating to $Q_{USG}$ are obtained by the subtracter 9. Also, as shown in FIG. 9K, signals relating to $Q_{SG}+Q_{USG}$ are obtained as the output voltage $V_{out}$ by the adder 10.

Figure 11:
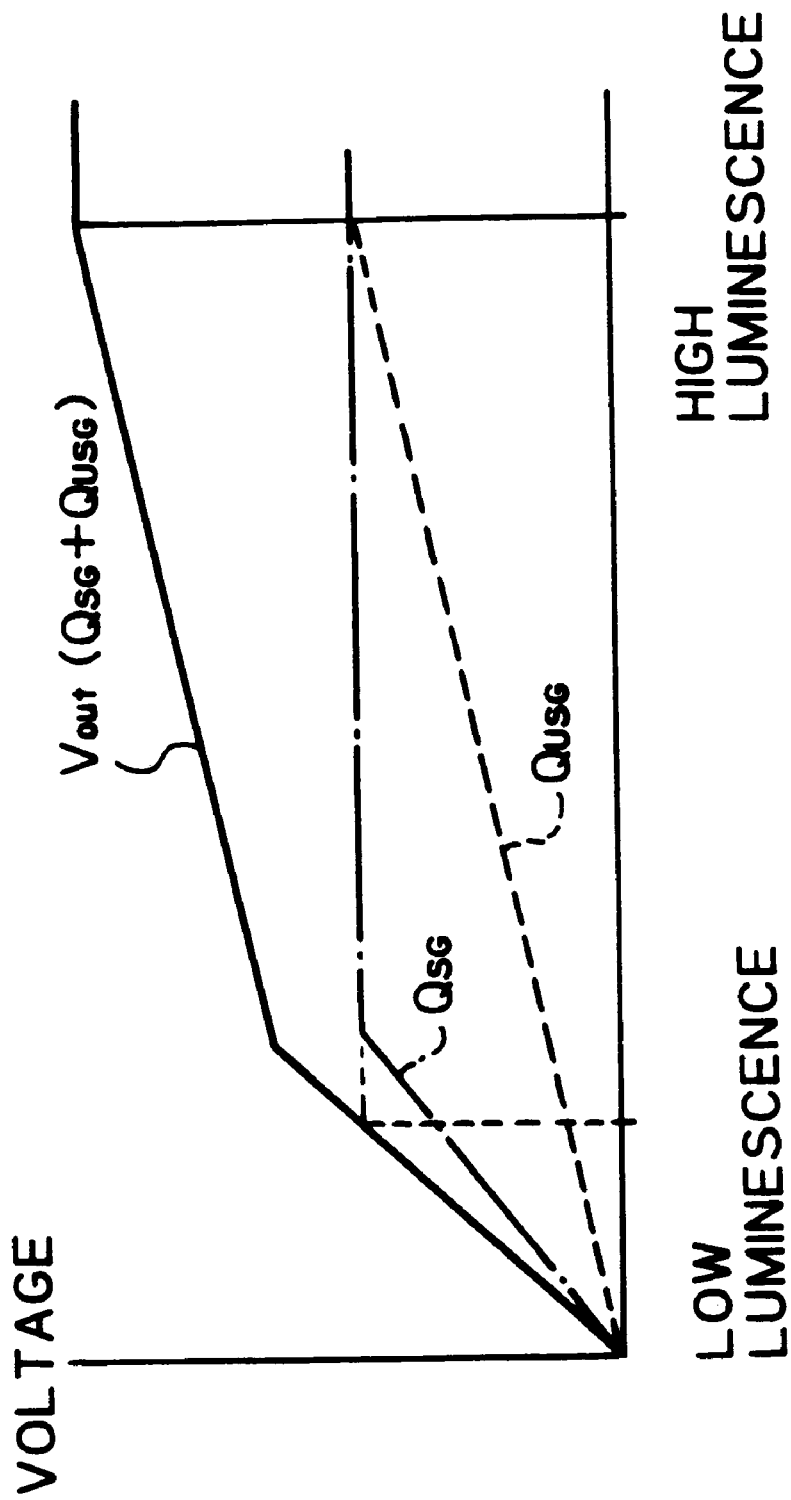
FIG. 11 is a graph showing the output voltage characteristics of the apparatus of FIG. 5.

The signals relating to $Q_{SG}+Q_{USG}$ as shown in FIG. 9K do not include the signals relating to the smear charges $Q_{SM}$, so that the smear characteristics can be sufficiently suppressed. In addition, as shown in FIG. 11, since the unsaturated charges $Q_{USG}$ are added to the output voltage $V_{out}$, the dynamic range of the output voltage $V_{out}$ can be increased.

In the first embodiment, the correspondence between the calculated horizontal lines is not the same. For example, the signals relating to $Q_{SM}$ during the time periods T3 and T4 are calculated by using the signals relating to $Q_{SG}+Q_{SM}$ of the first horizontal line and the signals relating to $Q_{SM}$ of the second horizontal line. On the other hand, the signals relating to $Q_{SM}$ during the time periods T5 and T6 are calculated by using the signals relating to $Q_{SG}+Q_{SM}$ of the third horizontal line and the signals relating to $Q_{SM}$ of the second horizontal line. In this case, however, the signals relating to $Q_{SG}+Q_{SM}$ of the first horizontal line have a strong correlation relationship with the signal relating to $Q_{SG}+Q_{SM}$ of the third horizontal line, so problems hardly occur.

Figure 12:
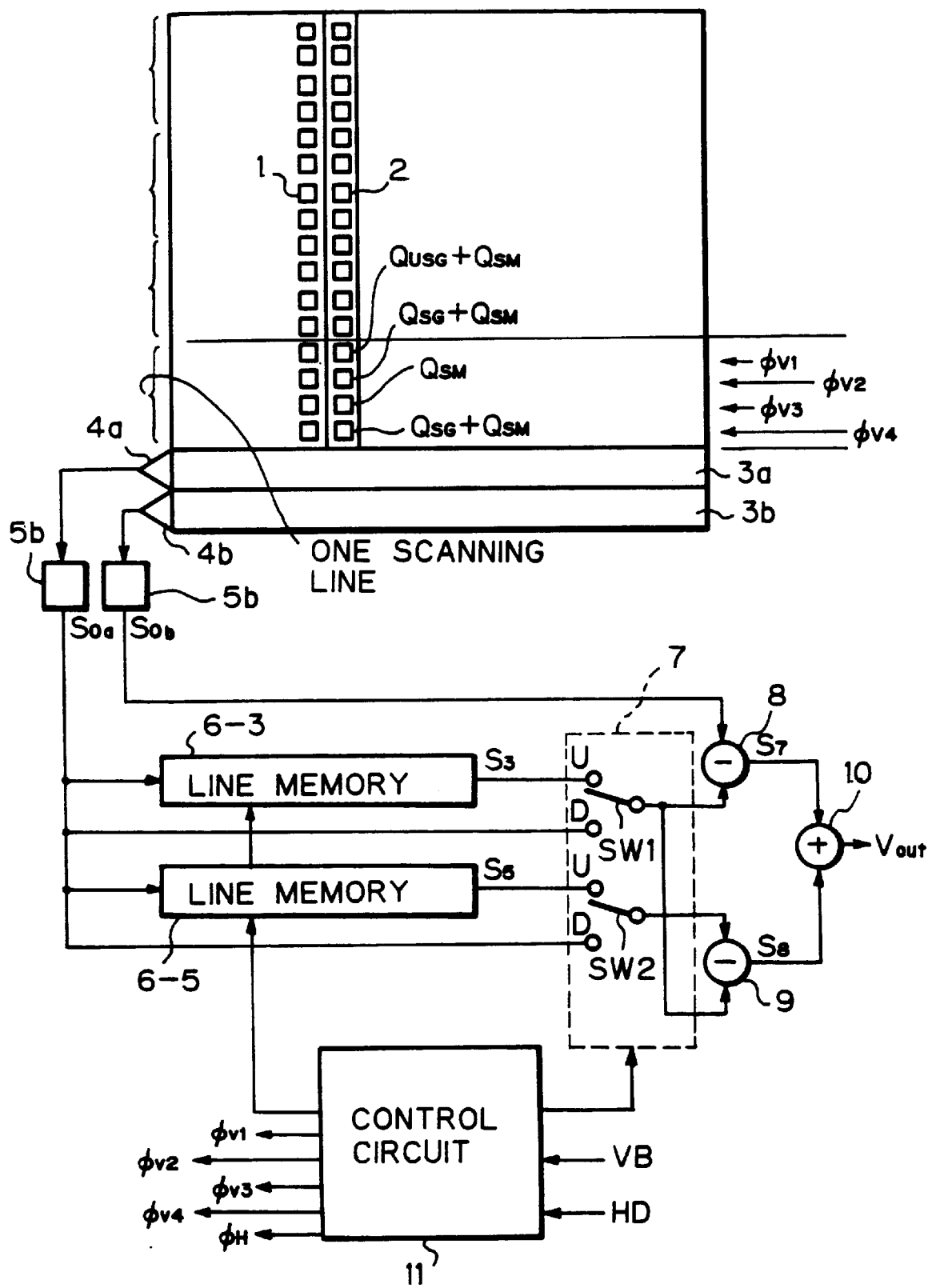
FIG. 12 is a block circuit diagram illustrating a second embodiment of the inter-line type CCD solid state image pickup apparatus according to the present invention.

In FIG. 12, which illustrates a second embodiment of the present invention, two horizontal transfer registers 3a and 3b, two output amplifiers 4a and 4b, and white clip circuits 5a and 5b are provided instead of the horizontal transfer register 3, the output amplifier 4 and the white clip circuit 5 of FIG. 5. The horizontal transfer register 3a transfers the signals relating to $Q_{SM}$ and $Q_{USG}+Q_{SM}$, while the horizontal transfer register 3b transfers the signals relating to $Q_{SG}+Q_{SM}$. Since the output signal of the horizontal transfer register 3a always generates the signals relating to $Q_{SG}+Q_{SM}$, the line memories 6-1 and 6-2 and the switch SW1 of FIG. 5 are deleted, so that the output signal $S_{O_b}$ of the white clip circuit 5b is supplied directly to the subtracter 8. Also, since the output signal of the horizontal transfer register 3b generates the signals relating to $Q_{SM}$ or $Q_{USG}+Q_{SM}$, the line memories 6-3 and 6-6 of FIG. 5 are deleted, so that the output signal $S_{O_a}$ of the white clip circuit 5a is supplied directly to the D terminals of the switches SW2 and SW3.

The output operation of the apparatus of FIG. 12 is further explained with reference to FIGS. 13A through 13H.

Figure 13:
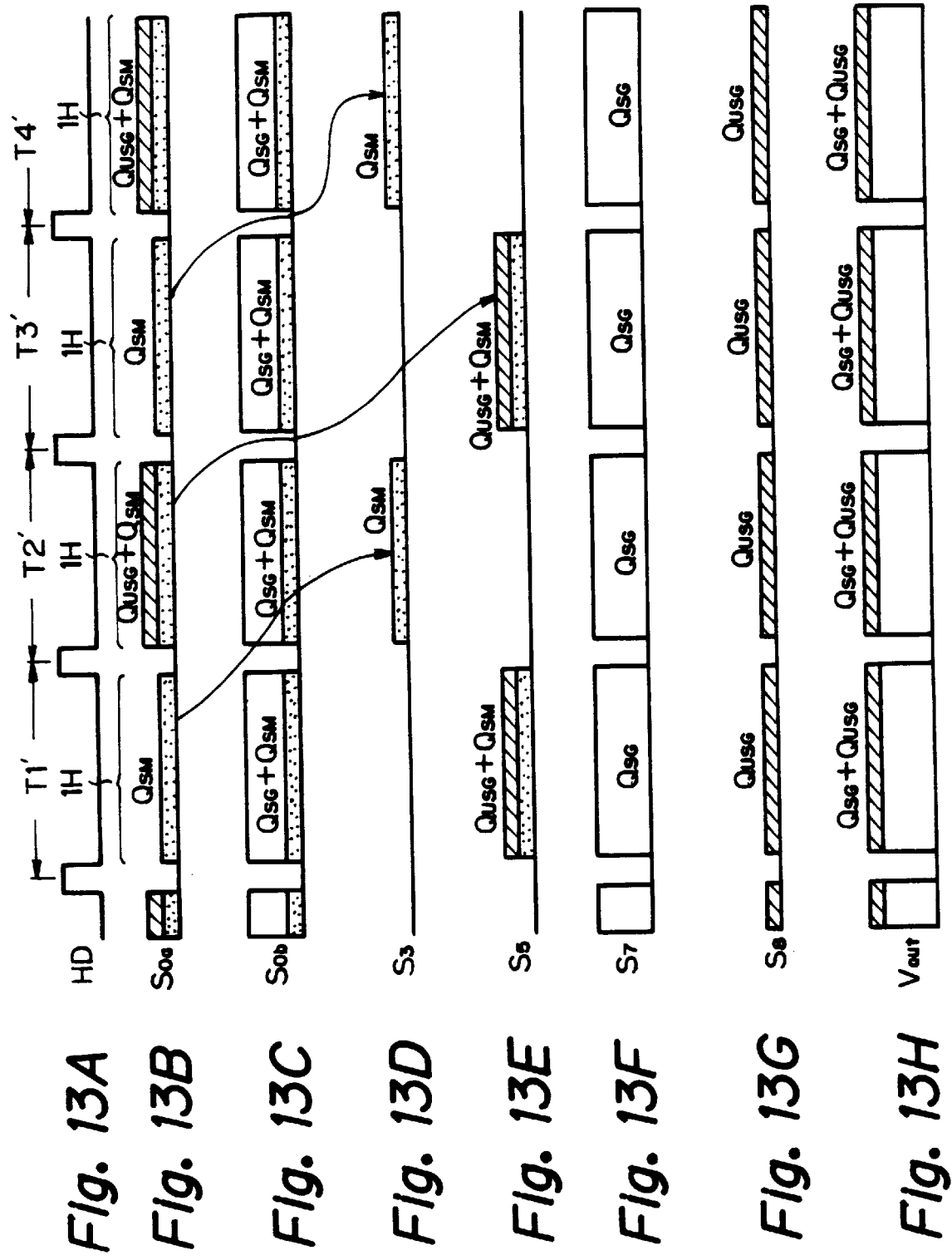
FIGS. 13A through 13H are timing diagrams showing the output operation of the apparatus of FIG. 12.

As shown in FIG. 13B, the output signal of the horizontal transfer register 3a, i.e., the output signal $S_{O_a}$ of the white clip circuit 5a is output at the rate of the horizontal synchronization signal HD as shown in FIG. 13A. Also, as shown in FIG. 13C, the output signal of the horizontal transfer register 3b, i.e., the output signal $S_{O_b}$ of the white clip circuit 5b is output at the rate of the horizontal synchronization signal HD as shown in FIG. 13A. This is due to the presence of two horizontal transfer registers.

In a time period T1', the control circuit 11 selects the line memory 6-3, so that the signals of pixels of a second horizontal line relating to $Q_{SM}$ are written into the line memory 6-3, as shown in FIG. 13D.

In a time period T2', the control circuit 11 selects the line memory 6-5, so that the signals of pixels of a fourth horizontal line relating to $Q_{USG}+Q_{SM}$ are written into the line memory 6-5, as shown in FIG. 13E.

Figure 14:
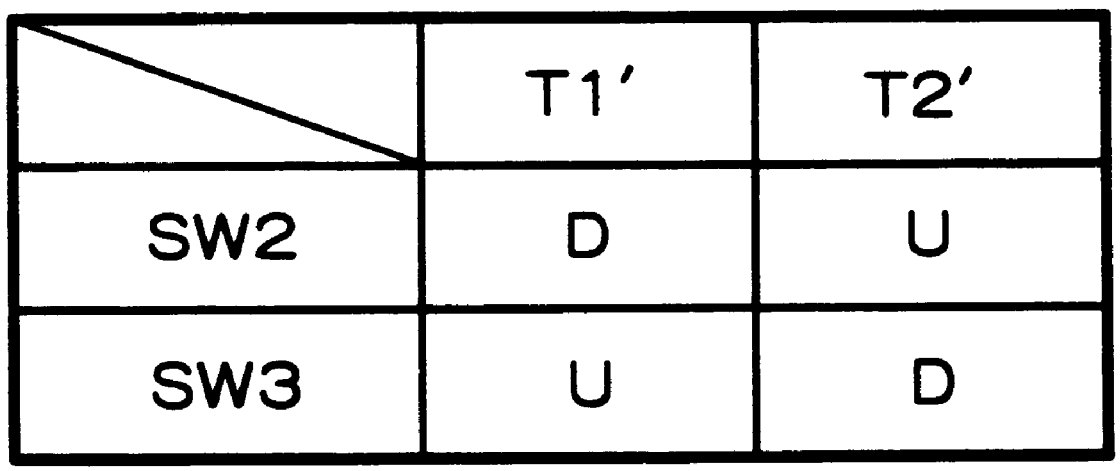
FIG. 14 is a table for showing the operation of the switching circuit of FIG. 12.

The switches SW2 and SW3 of the switching circuit 7 are controlled by the control circuit 11 in accordance with a table as shown in FIG. 14.

In the time period T1', the signals relating to $Q_{SG}+Q_{SM}$ as shown in FIG. 13C and the signals relating to $Q_{SM}$ as shown in FIG. 13B are supplied directly to the subtracter 8. As a result, as shown in FIG. 13F, signals relating to $Q_{SG}$ are obtained by the subtracter 8. On the other hand, in the time period T2', the signals relating to $Q_{SG}+Q_{SM}$ as shown in FIG. 13C are supplied directly to the subtracter 8, and the signals relating to $Q_{SM}$ as shown in FIG. 13D is supplied from the line memory 6-3 to the subtracter 8. As a result, as shown in FIG. 13F, signals relating to $Q_{SG}$ are also obtained by the subtracter 8.

In the time period T1', the signals relating to $Q_{USG}+Q_{SM}$ as shown in FIG. 13E are supplied from the line memory 6-5 to the subtracter 9, and the signals relating to $Q_{SM}$ as shown in FIG. 13B are supplied directly to the subtracter 9. As a result, as shown in FIG. 13G, signals relating to $Q_{USG}$ are obtained by the subtracter 9. On the other hand, in the time period T2', the signals relating to $Q_{USG}+Q_{SM}$ as shown in FIG. 13B are supplied directly to the subtracter 9, and the signals relating to $Q_{SM}$ as shown in FIG. 13D are supplied from the line memory 6-3 to the subtracter 9. As a result, as shown in FIG. 13G, signals relating to $Q_{USG}$ are also obtained by the subtracter 9.

As a result, as shown in FIG. 13H, signals relating to $Q_{SG}+Q_{USG}$ are obtained as the output voltage $V_{out}$ by the adder 10.

In the above-mentioned embodiments, although only one kind of unsaturated charges generated by one kind of blanking period are introduced, two or more kinds of unsaturated charges generated by two or more kinds of blanking periods can be introduced. In this case, if different kinds of unsaturated charges are defined by $Q_{USG1}, Q_{USG2}, \ldots, Q_{USGn}$, (n+1) subtracters corresponding to the subtracters 8 and 9 of FIGS. 5 and 12 are provided to calculate:

$$Q_{SG} = (Q_{SG} + Q_{SM}) - Q_{SM}$$

$$Q_{USG1} = (Q_{USG1} + Q_{SM}) - Q_{SM}$$

$$Q_{USG2} = (Q_{USG2} + Q_{SM}) - Q_{SM}$$

$$\vdots$$

$$Q_{USGn} = (Q_{USGn} + Q_{SM}) - Q_{SM}$$

Also, an adder corresponding to the adder 10 of FIGS. 5 and 12 is provided to calculate:

$$Q = Q_{SG} + Q_{USG1} + Q_{USG2} + \ldots + Q_{USGn}$$

As explained hereinabove, according to the present invention, the smear characteristics can be suppressed, and in addition, the dynamic range can be increased.

What is claimed is:

1. A solid state image pickup apparatus comprising:

two-dimensionally arranged photodiodes in rows, columns;

a plurality of vertical transfer registers, each connected to one column of said photodiodes;

at least one horizontal transfer register connected to said vertical transfer registers;

first transferring means for transferring at least two different signal charges of each column of said photodiodes based upon different charge storing time periods to one of said vertical transfer registers, so that said different signal charges are combined with respective smear charges within said vertical transfer registers;

second transferring means for transferring said different signal charges combined with said smear charges and independent smear charges to said horizontal transfer register;

subtracter means, operatively connected to said horizontal transfer register, for subtracting one of said independent smear charges from each of said different signal charges combined with said smear charges to generate said different signal charges; and an adder, connected to said subtracter means, for summing said different signal charges generated from said subtracting means to generate an output voltage based upon a sum of said different signal charges.

2. The apparatus as set forth in claim 1, further comprising third means for combining a group of said different signal charges except for specific signal charges of said different signal charges within said vertical transfer registers.

3. The apparatus as set forth in claim 1, wherein said second transferring means transfers each of said independent smear charges per a plurality of said different signal charges combined with said smear charges.

4. The apparatus as set forth in claim 1, further comprising white clip means operatively connected to said horizontal transfer register.

5. A solid state image pickup apparatus comprising:

two-dimensionally arranged photodiodes in rows, columns;

a plurality of vertical transfer registers, each connected to one column of said photodiodes;

a horizontal transfer register connected to said vertical transfer registers;

first transferring means for transferring first signal charges of each column of said photodiodes based upon a first charge storing time period to one of said vertical transfer registers, so that every four of said first signal charges are combined into one of unsaturated signal charges including first smear charges within said vertical transfer registers;

second transferring means for transferring second signal charges of each column of said photodiodes based upon a second charge storing time period shorter than said first charge storing time period to one of said vertical transfer registers, so that every two of said second signal charges are combined into one of third signal charges including second smear charges within said vertical transfer registers;

third transferring means for transferring series each formed by one of said third signal charges, an independent smear charge, one of said third signal charges and one of said unsaturated signal charges to said horizontal transfer register;

first and second line memories, operatively connected to said horizontal transfer register, for storing said third signal charges alternately;

third and fourth line memories, operatively connected to said horizontal transfer register, for storing said independent smear charges alternately;

fifth and sixth line memories, operatively connected to said horizontal transfer register, for storing said unsaturated signal charges alternately;

a first switch, connected to said first and second line memories, for selecting one of said first and second line memories;

a second switch, connected to said third and fourth line memories, for selecting one of said third and fourth lines memories;

a third switch, connected to said fifth and sixth line memories, for selecting one of said fifth and sixth line memories;

a first subtracter, connected to said first and second switches, for calculating a difference between one of said third charge signals and one of said independent smear charges to obtain one of said third charge signals excluding said first smear charges;

a second subtracter, connected to said second and third switches, for calculating a difference between one of said unsaturated charge signals and one of said independent smear charges to obtain one of said unsaturated charge signals excluding said second smear charges; and an adder, connected to said first and second subtracters, for summing one of said third signal charges excluding said first smear charges and one of said unsaturated signal charges excluding said second smear charges to generate an output voltage.

6. The apparatus as set forth in claim 5, further comprising a white clip circuit interposed between said horizontal transfer register and said first, second, third, fourth, fifth and sixth line memories.

7. A solid state image pickup apparatus comprising:

two-dimensionally arranged photodiodes in rows, columns;

a plurality of vertical transfer registers, each connected to one column of said photodiodes;

first and second horizontal transfer registers connected to said vertical transfer registers;

first transferring means for transferring first signal charges of each column of said photodiodes based upon a first charge storing time period to one of said vertical transfer registers, so that every four of said first signal charges are combined into one of unsaturated signal charges including first smear charges within said vertical transfer registers;

second transferring means for transferring second signal charges of each column of said photodiodes based upon a second charge storing time period shorter than said first charge storing time period to one of said vertical transfer registers, so that every two of said second signal charges are combined into one of third signal charges including second smear charges within said vertical transfer registers;

third transferring means for transferring series each formed by one of said third signal charges, an independent smear charge, one of said third signal charges and one of said unsaturated signal charges to said first and second horizontal transfer registers, said independent smear charges and said unsaturated signal charges being transferred in said first horizontal transfer register, said third signal charges being transferred to said second horizontal transfer register;

a first line memory, operatively connected to said first horizontal transfer register, for storing said independent smear charges;

a second line memory, operatively connected to said first horizontal transfer register, for storing said unsaturated signal charges;

a first switch, connected to said first line memory and said first horizontal transfer register, for selecting one of said first line memory and said first horizontal transfer register;

a second switch, connected to said second line memory and said first horizontal transfer register, for selecting one of said second line memory and said first horizontal transfer register;

a first subtracter, connected to said second horizontal transfer register and said first switch, for calculating a difference between one of said third charge signals and one of said independent smear charges to obtain one of said third charge signals excluding said first smear charges;

a second subtracter, connected to said first and second switches, for calculating a difference between one of said unsaturated charge signals and one of said independent smear charges to obtain one of said unsaturated charge signals excluding said second smear charges; and an adder, connected to said first and second subtracters, for summing one of said third signal charges excluding said first smear charges and one of said unsaturated signal charges excluding said second smear charges to generate an output voltage.

8. The apparatus as set forth in claim 7, further comprising:

a first white clip circuit interposed between said first horizontal transfer register, and said first and second line memories and said first and second switches; and a second white clip circuit interposed between said second horizontal transfer register and said first subtracter.

* * * * *